Jan. 13, 1953     F. R. HOHMANN     2,624,978
METHOD OF FORMING DOUBLE GLAZED UNITS
Filed Dec. 28, 1948     4 Sheets-Sheet 1

INVENTOR.
FREDERICK R. HOHMANN
BY Olen E Bee
ATTORNEY.

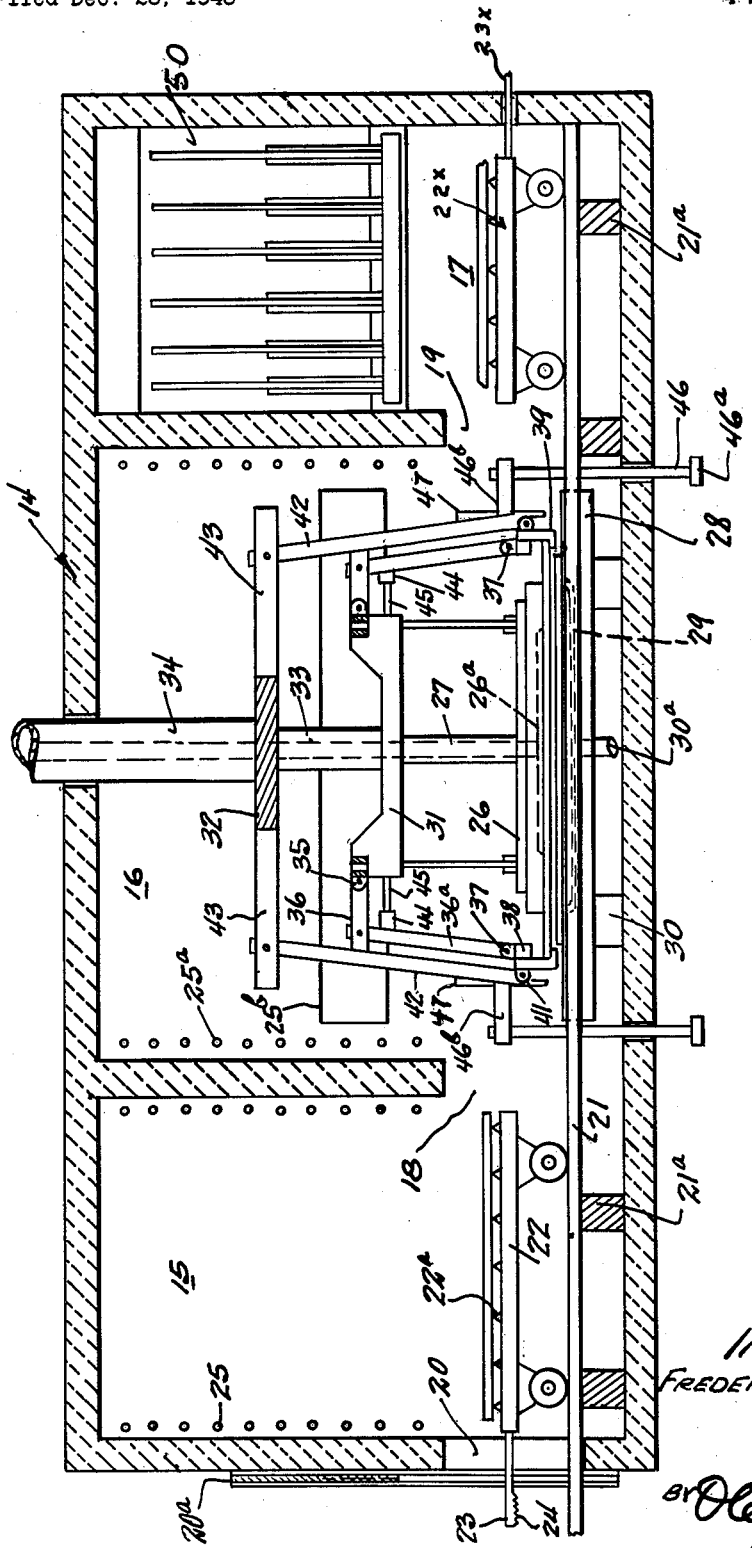

Jan. 13, 1953 F. R. HOHMANN 2,624,978
METHOD OF FORMING DOUBLE GLAZED UNITS
Filed Dec. 28, 1948 4 Sheets-Sheet 3

INVENTOR.
FREDERICK R. HOHMANN
BY
Olen E Bee
ATTORNEY.

Jan. 13, 1953           F. R. HOHMANN           2,624,978
METHOD OF FORMING DOUBLE GLAZED UNITS
Filed Dec. 28, 1948           4 Sheets-Sheet 4
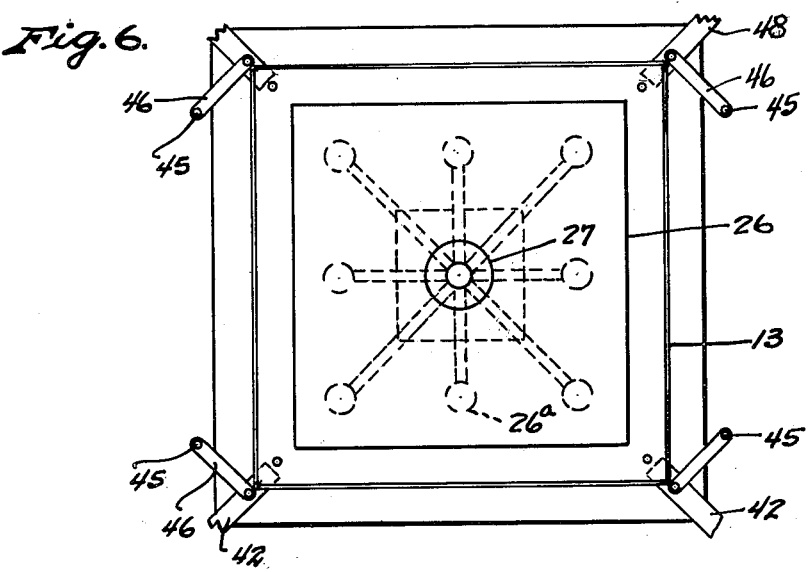
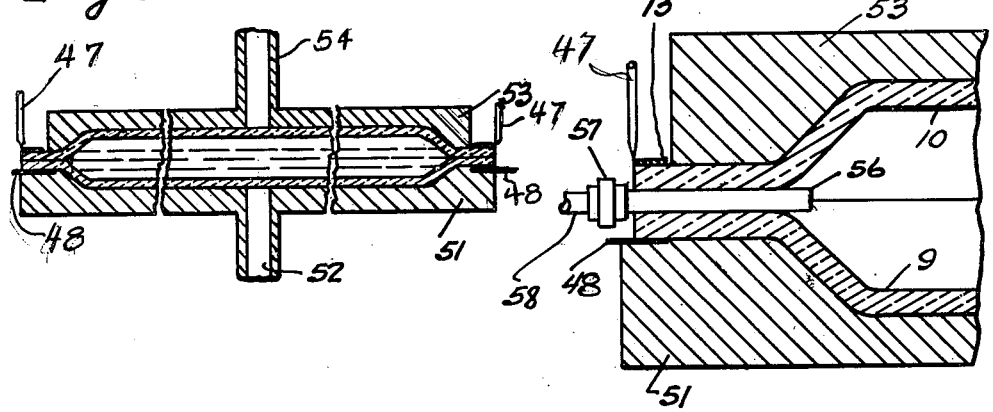
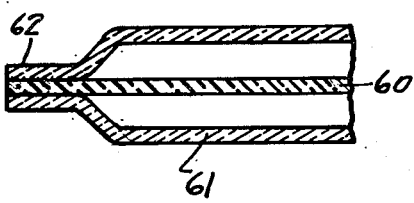
INVENTOR.
FREDERICK R. HOHMANN
BY
Olen E. Bee
ATTORNEY.

Patented Jan. 13, 1953

2,624,978

UNITED STATES PATENT OFFICE 2,624,978

METHOD OF FORMING DOUBLE GLAZED UNITS

Frederick R. Hohmann, New Kensington, Pa., assignor to Pittsburgh Plate Glass Company, Allegheny County, Pa., a corporation of Pennsylvania Application December 28, 1948, Serial No. 67,685

4 Claims. (Cl. 49—82)

1

The present invention relates to a process of constructing multiple glazed units for windows.

One object of the invention is to provide a process of constructing a multiple glazed unit which is composed of spaced sheets of glass welded together at their margins to provide a solid, hermetically sealed unit.

A second object of the invention is to provide a process of constructing an improved weld between the sheets of glass.

A third object of the invention is to provide a process of constructing a unit which is stronger and more durable than units constructed by the methods heretofore proposed.

A fourth object of the invention is to provide a process of constructing a multiple glazed unit which is well adapted for mounting in a sash.

A fifth object of the invention is to provide a simple process of forming such windows in which process a minimum of apparatus is required.

A sixth object is inexpensively to provide a process of constructing a multiple glazed unit having the foregoing advantages.

These and other objects of the invention will be apparent from consideration of the following specification and the appended claims.

It has heretofore been recognized that the windows in buildings, show cases, refrigerators, vehicles and such like structures, constitute areas through which a great deal of heat is transmitted either outwardly to produce chilling or inwardly to cause overheating. The transfer of heat in this manner is usually objectionable for numerous reasons. For example, in buildings during cold weather large amounts of heat are lost to the outside air. Chilling in the interior of the buildings or structures results and convectional drafts are induced. If the air outside of the building or structure is very cold, moisture is likely to condense on the glass, resulting in obscuration of vision, staining of the glass and other objectionable effects. Of course, in warm weather the flow of heat was reversed resulting in the heating up of the buildings in an objectionable manner.

In order to overcome these effects it has heretofore been proposed to provide windows comprising a plurality of spaced sheets of glass, between which is maintained a dead air space that reduces the transfer of heat. Conventional storm sashes constitute one form of such structure. Where storm sashes are used, a plurality of separate sashes are required. Such sashes, within themselves are expensive. Also they are inconvenient because they usually must be removed and stored in warm weather and replaced in cold weather, which is a bothersome operation. Furthermore, it is practically impossible completely to seal the space between the sashes and dirt often gets between them where it is difficult

2 to remove it by washing without removing the sashes.

In order to obviate these objectionable features of storm sashes, it has heretofore been proposed to provide double glazed units embodying spaced plates of glass, the edges of which are appropriately sealed together and which can be inserted in a single sash in much the same manner as conventional single panes of glass. Windows so glazed can be opened in the same manner as conventional single sash windows and do not require removal of a sash or replacement with seasonal changes. Such constructions theoretically, of course are excellent, but in actual practice, many problems have heretofore been encountered in their construction and use. In order to seal the sheets of glass together in double glazed units, various expedients have been tried. For example, spacer strips of plastic materials such as rubber have been inserted between the sheets of glass and edge channels have been provided to hold the sheets together in contact with the spacer strips. This type of construction is expensive, complicated and not very strong. It is an impossibility to exclude moisture from such constructions so that during cold weather, water is condensed between the sheets where it is impossible to remove it. This effect is often seen in the windows of the double glazed railroad coaches during cold weather.

In order to eliminate the moisture from within the units, it has been proposed to insert devices comprising a desiccant designed to absorb moisture within the units. It will be obvious that such devices are not satisfactory, inasmuch as the desiccant soon becomes charged with moisture taken up from the atmosphere and cannot maintain the air in the units in a moisture free state. The only way that the units can be restored to usefulness is by replacement of the desiccant. However, this is a relatively difficult and expensive operation and in actual practice, usually is put off as long as possible or entirely neglected.

Another approach to the problem has involved the provision of double glazed units in which an edge portion of one sheet of the glass is fused or welded to the continuous sheet in such manner as to provide a continuous glass seal through which moisture does not permeate or at least it permeates only extremely slowly in the same manner that it will permeate through a sheet of glass in the course of time. One process and apparatus for forming double glazed units in this manner is disclosed in Gray Patent No. 2,398,525 or Guyer et al. Patent No. 2,389,360. According to the procedure disclosed in these patents, the edge portions of the sheets of glass are striped with a conductive material such as a water suspension of graphite. The plates are held in spaced relation with respect to each other and electrical current is passed through the stripes in order to heat the glass to the softening point. The edges of one sheet are then folded down until they contact with the upper face of the lower sheet of the glass and the contacting portions become fused together in a permanent seal.

It is possible thus to form practically perfectly sealed units which will remain free of moisture for very long periods of time and therefore do not tend to fog up by reason of moisture condensation during any period of service. Still, the units thus formed are not satisfactory from the standpoint of strength. This lack of strength is due at least in part to the small area of bond or union between the edges of the upper sheet of glass and the lower sheet of glass. Furthermore, the bend where the edges of the upper sheet are folded downwardly is likely to be very sharp. These points in the construction are highly vulnerable and in normal operation of the units, are subject to breakage due to atmospheric stresses or to stresses set up by reason of differentials of temperature between the portions of the units.

The present invention contemplates the provision of a process and a construction whereby the foregoing difficulties as heretofore encountered in the construction of welded double glazed units are substantially obviated. In accordance with the present invention, sheets of glass having edge stripes of conductive material similar to those heretofore employed are brought into contact or near contact and in superposed or almost superposed relation with each other. An electrical current is then passed through the stripe edges in order to heat and weld the contiguous glass portions together in the area of the stripes while they are still practically flat. When the welds have been properly established, and while the glass adjacent the welds is still in a softened condition, the portions of the sheets intermediate the welds are separated to form an air space between the sheets.

For a better understanding of the invention, reference may now be had to the accompanying drawings in which:

Figure 4 is a diagrammatic cross-sectional view of an appropriate embodiment of apparatus for use in the practice of the invention.

Figure 6 is a further fragmentary plan view of a second part of the apparatus shown in Figure 4.

Figure 7 is a sectional view of a modified form of construction.

Figure 8 is a fragmentary sectional view of a portion of the construction shown in Figure 7.

Figure 9 is a fragmentary section of a modified construction.

Figure 1:
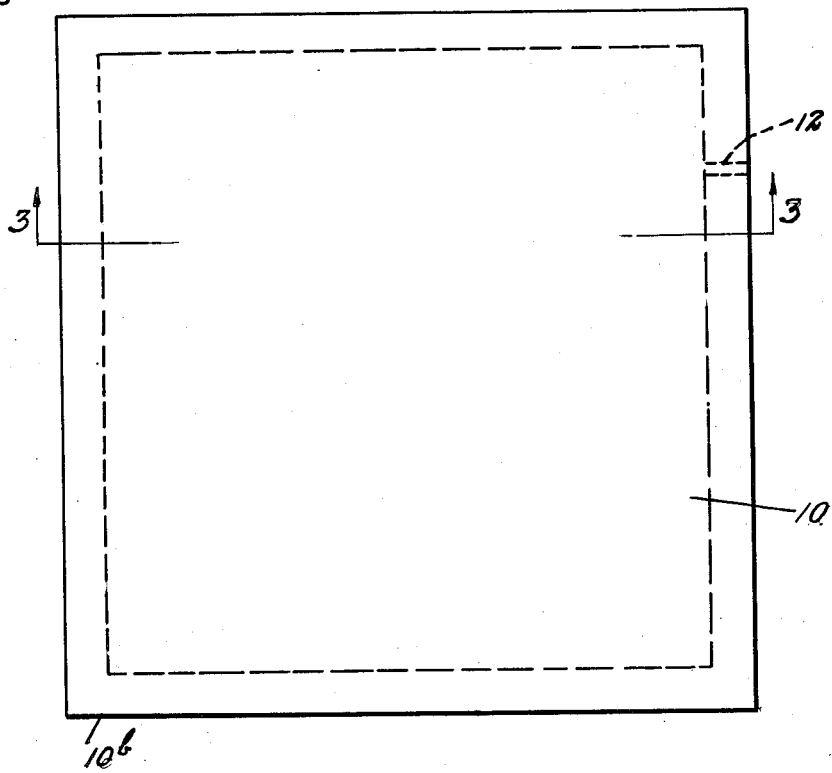
Figure 1 is a plan view of a double glazed unit constructed in accordance with the provisions of the invention.
Figure 3:
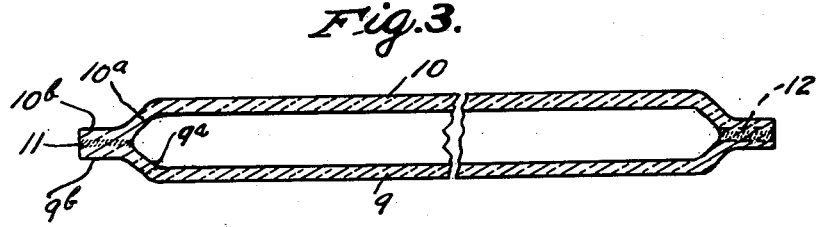
Figure 3 is a sectional view taken on the lines 3—3 of the double glazed units disclosed in Figure 1.
Figure 1A:
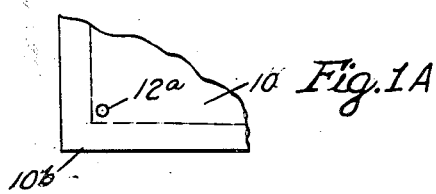
Figure 1A is a fragmentary view showing a modification of Figure 1.
Figure 5:
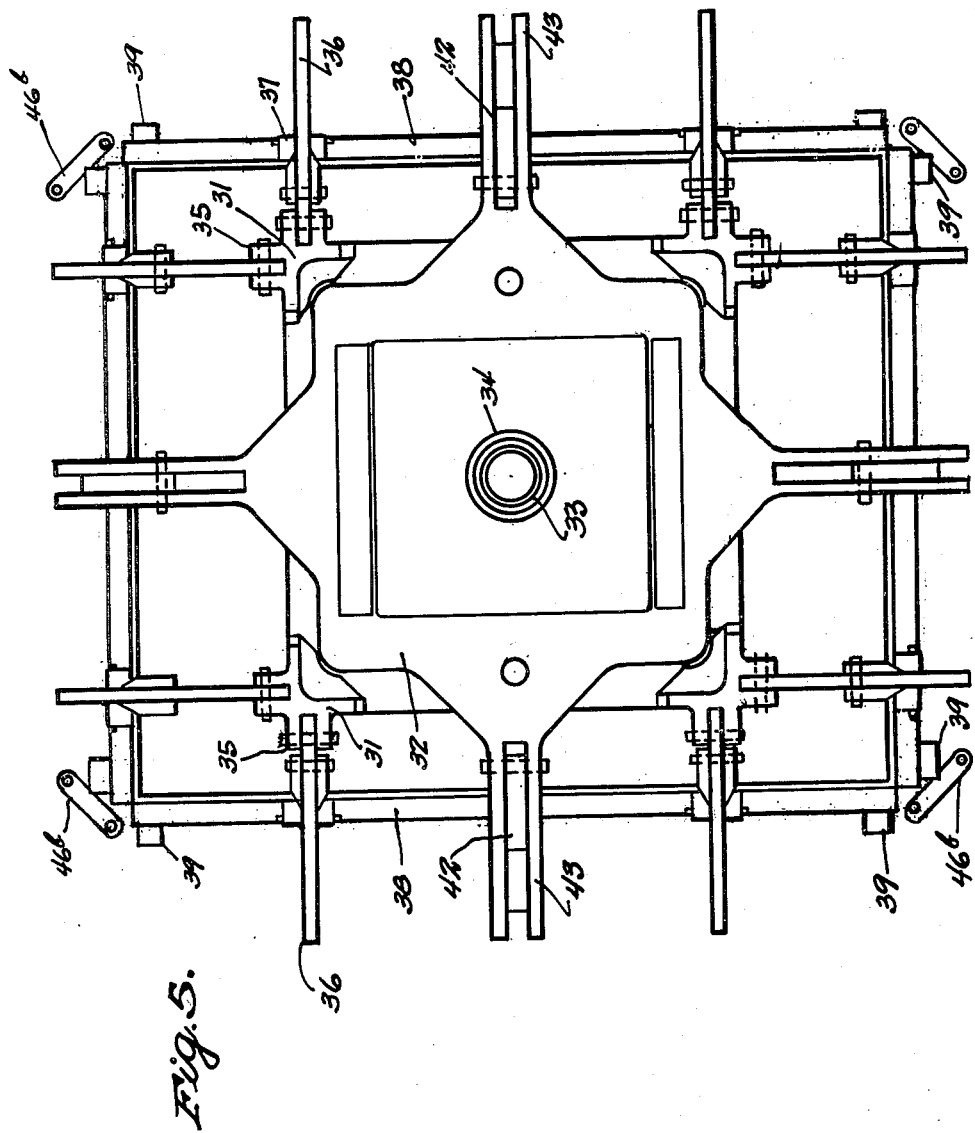
Figure 5 is a fragmentary plan view of a portion of the apparatus shown in Figure 4.

A double glazed unit constructed by the process of the invention is disclosed in Figures 1 and 3. It comprises a pair of spaced sheets of glass 9 and 10 which may be any glass suitable for forming windows, e. g. ordinary window glass or plate glass. These sheets are of the same width, and have inwardly bent shoulder portions 9a and 10a which further have flange like margins 9b and 10b. The contiguous faces of the flanges are sealed together along a line 11 to provide a unitary structure. This structure should be provided with one or more vents which in the finished constructions are hermetically sealed but are open during the welding operations. The vents may be formed in any convenient location and in any convenient manner. They may take the form of grooves 12 in the edges of one or both plates or they may be formed by drilling small holes 12a in one or both plates preferably in an inconspicuous location, e. g. a corner of the plate. It is to be observed that the flanges 9b and 10b provide a substantial area of weld whereby to effect a strong union between the plates. They may be ¼ or even ½ inch wide or even more. These flanges, it will be observed constitute convenient edges for setting into the rabbets of sashes and may be puttied in substantially the same manner and the same sashes as conventional single glazed window panes.

It is to be observed that the shoulders 9a and 10a are so curved that there are no sharp angles that would provide possible lines of weakness in the finished structure.

In the formation of the units, the plates of glass 9 and 10, which may be of the same size, are provided. One or both of these plates or sheets may be grooved at its edges as shown at 12 or bored with an appropriate drill to provide small pore holes 12a at some point which will be relatively inconspicuous in the finished construction. These holes are for purposes of admitting gases to the units during the steps of separating the glass plates, as will be described. The plates 9 and 10 are provided, contiguous to the margins thereof, with stripes 13 of conductive material. For example, these stripes may comprise a water suspension of colloidal graphite applied in any conventional manner to one or both sides of each sheet of glass. They may also comprise so called "Nesa" stripes as obtained by spraying tin chloride solution against hot glass. The manner of application of these stripes is not particularly a feature of the present invention. The technique may be the same as that embodied in the process as described in the aforementioned Guyer et al. patent. Preferably the stripes extend all the way, or nearly all of the way to the margins of the glass and they preferably are of approximately the width of the area which is to be heated to the welding temperature. The stripes may be comparatively narrow, or if the units are likely to be subjected to high surface stress, the stripes may be wider in order to obtain a greater area of weld between the two sheets of glass.

Plates or sheets of glass to be welded after they are provided with vent openings and conductive stripes, are preheated to a temperature slightly above critical in order to relieve strains therein and to prevent breakage during the subsequent steps of heating the edges for forming the welds. A temperature of 800 to 1000° F. is usually sufficient.

Figure 2:
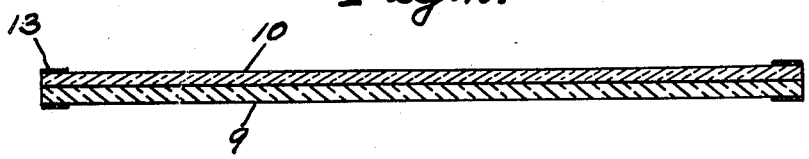
Figure 2 illustrates a pair of sheets of glass as arranged in the intermediate stages of the process.

The preheated sheets may be superposed in the manner indicated in Fig. 2, the conductive stripes in the embodiments shown, being faced respectively upwardly and downwardly so as to leave the faces of the glass which are in contact, or substantially in contact, free of combustible material.

In order to weld the plates of glass together, electrodes are brought into contact or near contact with the conductive stripes, preferably at or near the corners of the sheets of glass. This part of the technique substantially corresponds to that disclosed in the aforementioned Gray or Guyer et al. patents. Electrical current of sufficiently high voltage to pass through the stripes is then applied preferably in sections corresponding to the sides of glass, the sections being energized in succession rather than simultaneously. When the glass has been sufficiently heated by the electrical current passing through the stripes and the graphite is burned away, the glass itself becomes a conductor and continues to carry the current until the glass is fused or at least sufficiently softened by heat at the striped area so that the two sheets become welded together as a homogeneous unit about their edge portions.

When the plates have been properly welded together at the margins, they are then spaced or separated by appropriate technique. One conventional technique involves the application of vacuum cups of refractory material to the upper and lower sheets of glass. These vacuum cups are then moved apart to effect separation of the plates. During separation of plates 9 and 10 the heat softened glass adjacent the fused margins will bend to form the portions 9a and 10a. During the separation, air or other gas flows through the pore opening 12 or 12a into the growing chamber between the plates. Another conventional method of spacing plates would involve insertion of the unit between upper and lower mold sections having concavities hollowed out to correspond to the outer contours of the double glazed unit. These molds may be provided with suction means by means of which vacuum can be created in the cavities to effect separation of the plates of glass by bending the heat softened glass portions 9a and 10a as in Fig. 7.

Still another method of separating the plates would involve insertion of the welded flat plates between suitable mold surfaces or limit plates, and the introduction of a compressed fluid such as air through the pore openings of the unit in order to inflate the unit, by bending the heat softened glass adjacent the weld, until the surfaces thereof are brought into contact with the mold surfaces. This modification is shown in Fig. 8 of the drawings. The units, when cooled slightly, can be handled and annealed.

An appropriate embodiment of apparatus for use in the practice of the invention is illustrated in Figure 4 of the drawings. This apparatus includes a furnace 14 having three chambers 15, 16 and 17 which are respectively a preheating chamber, a welding chamber and an annealing lehr. The chambers communicate with each other through doors 18 and 19. Chamber 15 also has an exterior door 20 having closure 20a. A trackway 21 on supports 21a extends through the openings or doors and is designed for transferring car 22 that carries the plates of glass into chamber 15, then to chamber 16. The car 22 is appropriately operated by means of a ram or bar 23 which is attached to the car and which is also provided with suitable rack teeth 24 by means of which the bar can be operated by a pinion 24a. A similar car 22x functions to carry the hot but welded units to chamber 17 for annealing. Car 22x may be activated manually or mechanically by push rod 23x.

Plates of glass supported on buttons 22a on car 22 are maintained in this chamber until the glass has passed above the critical temperature, that is to a temperature above that at which it is subject to breakage by thermal shock or by unequal heating. During the stay in the chamber, heat is supplied electrically or otherwise by heating elements 25. The critical temperature, of course, will vary with different glasses. Though for most of the conventional window glasses, the critical value will be from about 800 to 1000° F.

Plates of glass having the graphite stripes 13 upon the edges as previously described and also having grooves or pore holes 12 or 12a appropriately formed therein, after preheating in the chamber 15, are advanced to the welding chamber 16 which is electrically heated by elements 25a to assist in maintaining the temperature of the glass. The chamber may embody a window opening 25b through which the operations within the chamber may be observed while the units are being formed.

The apparatus for welding and shaping the units includes upper platen 26, supported upon a hollow piston rod 27 that extends upwardly through the chamber and is provided at its upper end with appropriate operating mechanism such as cylinders for compressed air, or any other convenient reciprocating mechanism for raising and lowering it. The platen 26 is provided upon its lower face with suitable vacuum cups 26a for holding and pulling upon plates of glass. These cups may be connected to any source of vacuum (not shown) through the hollow piston 27.

Similarly a lower platen 28 is provied with cups 29 upon its upper face. This platen may be fixedly mounted or it may be mounted on a reciprocating piston similar to the piston 27. In the construction shown it is mounted upon blocks 30 resting upon the bottom of the chamber 16, and is connected by line 30a to a source of vacuum for cups 29.

Mechanism for centering plates of preheated glass in order accurately to align them with the vacuum cups, with each other and with the electrodes to be described, is desirable, but may be dispensed with since, the centering operation can be performed manually. The apparatus includes cross heads 31 and 32 mounted upon the lower extremities of rods 33 and 34. These rods are hollow and concentric with the rod 27. At its upper extremities, rod 34 is provided with suitable mechanisms such as a piston head, operating in a cylinder (not shown) for actuating fluid, by means of which it may be reciprocated independently with respect to the rod 27. Rod 33 preferably is fixedly mounted. Obviously both of the rods 27 and 34 may be reciprocated simultaneously if so desired.

Cross head 31, at its outer extremity, is provided with lugs 35 to which brackets 36 are rigidly connected. These brackets 36 are further pivotally or hingedly connected to downwardly extending links 36a, that at their lower ends are also hingedly connected to lugs 37 on cross bars 38 having fingers 39 adapted to engage the edges of sheets of glass.

Lugs 41 are also provided upon the bars 38 and are pivotally connected to a second set of links 42 which at their upper extremities are pivotally connected to brackets or arms 43 extending from the cross head 32. It will be obvious that bars 38 are provided for each of the four edges of a sheet of glass and each of course, is provided with the necessary link mechanism for operating it, so that by swinging the bars inwardly or outwardly, the plate of glass can be held and correctly centered with respect to the platens 26 and 28.

If desired, appropriate stops for limiting the downward motion of the links can be provided. Such mechanism would include lugs 44 upon links 36a designed to engage with stop screws 45 threaded into the cross head 31. By adjustment of the screws 45 the movement of the links 36a can be accurately limited in such manner as nicely to center a sheet of glass engaged by the links.

In the operation of this mechanism, it is to be understood that the sheet of glass to be preheated in the chamber 15 would be appropriately striped as at 13 and provided with proper vents. It is carried by the car 22 into the chamber 16 when it is preheated. The platen 26 is then lowered to engage the plate and to lift it from the car. The links 36a and 42 will be swung downwardly to engage the fingers 38 with the edges of the glass and thus accurately to center the glass either before or after it is taken from the car. The plate is deposited upon the platen 28. The second sheet of glass (preheated) may then be brought in and also centered and deposited upon the top of the first sheet.

Mechanism for applying electrical current to the conductive striping upon the edges of the sheets of glass may be of any convenient construction. In the embodiment shown, the electrode mechanism includes rotatable shafts or arms 46 extending upwardly through the bottom of the chamber 16 and being adapted to rotate about their vertical axes, e. g. by insulative knobs or handwheels 46a. These shafts, at their upper extremities, are provided with horizontal arms 46b that at their free extremities carry vertical pencil like electrodes 47 that can be engaged with the stripes upon the edges of the upper sheet of glass. Needless to say, the shafts 46 or the electrodes 47 are provided with the necessary source of electric current (not shown).

Ribbon like electrodes 48 shown in Fig. 6 lay on top of platen 28 in position to contact the stripes on the lower plate of glass 9 in order to heat the margins thereof.

In the operation of the construction, after the plate of glass is centered upon the platen 28, the arms 46b are swung to bring the electrodes 47 near to or into contact with the edges of the glass at the points where the stripes extend to the edges. Such contact for conduction of current through the stripes upon the glass is thus provided without the danger of excessive arcing. The plates of glass upon the platen 28, with the electrodes in proper position, are subjected to the electric current in order to heat up the conductive stripes and thus to heat the margins of the sheets between the stripes. As the temperature rises, the stripes will be burned off. However, the heated glass becomes conductive and continues to carry the current until the temperature of the glass is sufficient to soften and fuses together along the area previously striped.

When the glass is adequately bonded and while the glass adjacent the bond is still soft, the plates may be separated by application of vacuum to the cups in the platens and elevation of the upper plate through actuation of the piston rod 27. The plates are pulled apart a distance approximately sufficient to obtain the desired space as shown in Fig. 3 of the darwings. It is also admissible to work the glass in the edge portions slightly by vibrating the upper platen. The movement, of course, should be only very slight. Such working assists in establishing rounding or filleting at the junction between the plates of glass which, in some cases, is desirable in order to obtain maximum strength in the construction.

The units, when they have been formed, may be set by slightly cooling. They are picked up from the platen 28 by means of the vacuum cups in the platen 26. They are then lifted and the transfer car 22x is run thereunder. The unit is lowered, released and is subsequently run through the opening 19 into the chamber 17 for annealing. Of course, the units could be left individually on the cars while they are being cooled slowly through the necessary critical range in order to anneal them and thus relieve internal stresses in the heated glass. However, such operation would be wasteful of space and apparatus. In order to operate more economically, it is desirable to transfer the units from the transfer car 22x. This may be done, for example, by picking the units up by any convenient apparatus and transferring them to racks 49 appropriately supported within the chamber 17. The car may then be returned to its original position for the preheating and transferring of further sheets of glass.

The units, when annealed, may be removed through an opening or door (not shown) in the side of the annealing chamber. They are subjected to a sealing operation for closing the openings 12 or 12a. Such sealing may be effected by application of a solder or an alloy of low melting point that will expand on cooling (e. g. Rose's metal). If the glass is slightly heated when the solder or alloy is applied, a bond to the surface may be obtained which seals the opening. The soldering of this glass in this manner is a well known technique and need not be described in detail. Other modes of sealing the openings, of course, are permissible.

A slight modification of the technique of forming the units is illustrated in Figs. 7 and 8 of the drawings. In this embodiment, the plates of glass appropriately preheated are disposed upon the lower section 51 of a mold chamber. This section is provided with a connection 52 for vacuum. A similar upper mold section 53 is also provided with vacuum connection 54. The plates of glass are disposed over the chamber in the section 51 while section 53 is elevated. The edges of the plates are engaged and held by lowering the mold section 53. Vacuum is then applied in the mold chambers in order to separate the upper and lower plates in the manner indicated in the drawings.

In order to admit air to the space between the plates as they are drawn apart, a suitable vent connection is supplied. This may take the form of a tube of heat resistant alloy such as stainless steel, indicated at 56. It may be inserted in notches or grooves in the edges of the flange portions of the plates of glass or it may be forced between the plates after they have been partly fused or softened. If desired, the tube 56 may be connected, as for example by a coupling 57, to a source of fluid supply, e. g. a pipe or conduit 58. Obviously, the fluid could be under compression so that the plates of glass are forced apart by internal pressure, in which case the use of vacuum in the molds can be avoided.

A further modification of the invention is illustrated in Fig. 9. According to this construction, three plates of glass are provided. The central plate 60 is maintained substantially flat. A plate 61 is placed beneath this plate and the top plate 62 is superposed. The edges of the plates 61 and 62 are provided with conductive stripes and are heated in the manner previously described. The three plates may be superposed upon the platen 28. The edges of top and bottom plates may be heated electrically and the top and bottom plates pulled away from the intermediate plate 60 by application of a vacuum.

Obviously, two dead air chambers are thus provided in the units so that connectional and more effective insulation is obtained than with two plates. The construction is also stronger. Furthermore, the inner plate is protected from scratches and marring which possibly might provide zones of weakness which might result in failure of the units during service.

I claim:

1. In the method of forming double glazing units by providing conductive material upon the edges of a pair of plates of glass and passing electricity through the conductive material to heat the edges and fuse them together, the steps which comprise supporting the plates of glass while flat and approximately in contact with each other, then passing electrical current through the edge stripes of conductive material to heat the adjacent glass to fuse the plates together in the area of the stripes, then separating the plates in the non-fused portions by bending the softened portions adjacent the fused portions to form edge walls and thus provide the double glazing units.

2. A process of forming sealed double glazing units, which process comprises providing edge stripes of conductive material upon two plates of glass, superposing the plates approximately in contact with each other, passing electrical current through the stripes to heat the edge portions at the stripes and to fuse them together, then forcing the plates apart in the unfused portions thereof while the glass adjacent the fused portions is in heat softened condition.

3. In the method of forming double glazed units, the steps of superposing two substantially flat plates of glass, welding the marginal edge portions of the plates together by heating them to fusion temperature, then displacing the unfused portions of the plates relative to the fused portion to form a chamber by bending the heat softened glass adjacent the fused margin and admitting air to the chamber during the formation thereof.

4. The method as defined in claim 3, in which the portions of the plates intermediate the welds are shaped and separated by top and bottom recessed molds into which the glass is drawn by vacuum.

FREDERICK R. HOHMANN.

REFERENCES CITED

The following references are of record in the file of this patent:

UNITED STATES PATENTS

| Number | Name | Date |
| --- | --- | --- |
| 2,149,246 | Zimmerman et al. | Feb. 28, 1939 |
| 2,303,125 | Knight | Nov. 24, 1942 |
| 2,389,360 | Guyer et al. | Nov. 20, 1945 |
| 2,398,371 | Gerspacher | Apr. 16, 1946 |
| 2,478,812 | Drake | Aug. 9, 1949 |